R. W. LEWIS.
ASSEMBLING AND BANDING MACHINE.
APPLICATION FILED JAN. 21, 1913.

1,221,196.

Patented Apr. 3, 1917.
18 SHEETS—SHEET 1.

Witnesses:

Inventor:
Russell W. Lewis.
By G. L. Cragg
Atty.

R. W. LEWIS.
ASSEMBLING AND BANDING MACHINE.
APPLICATION FILED JAN. 21, 1913.

1,221,196.

Patented Apr. 3, 1917.
18 SHEETS—SHEET 2.

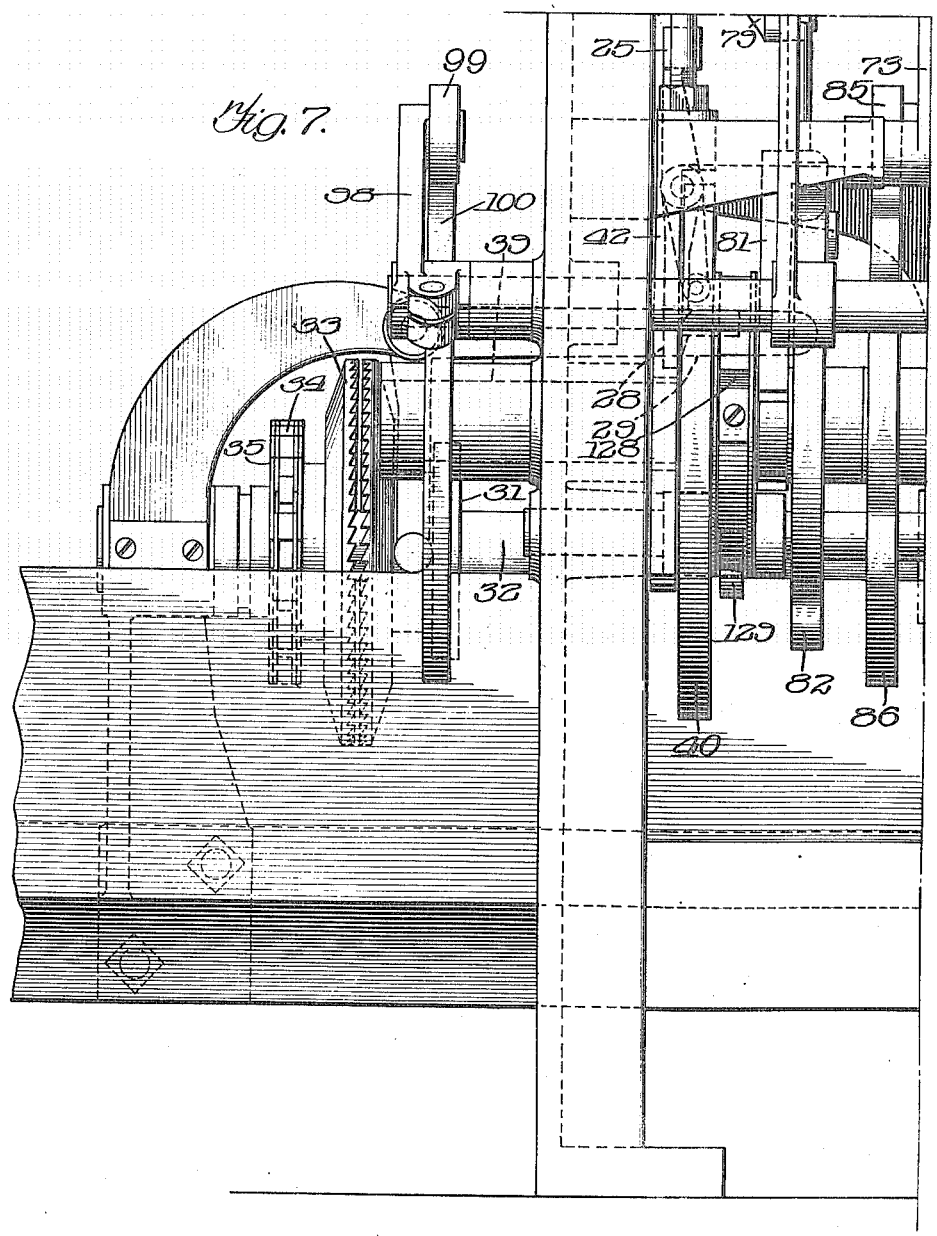

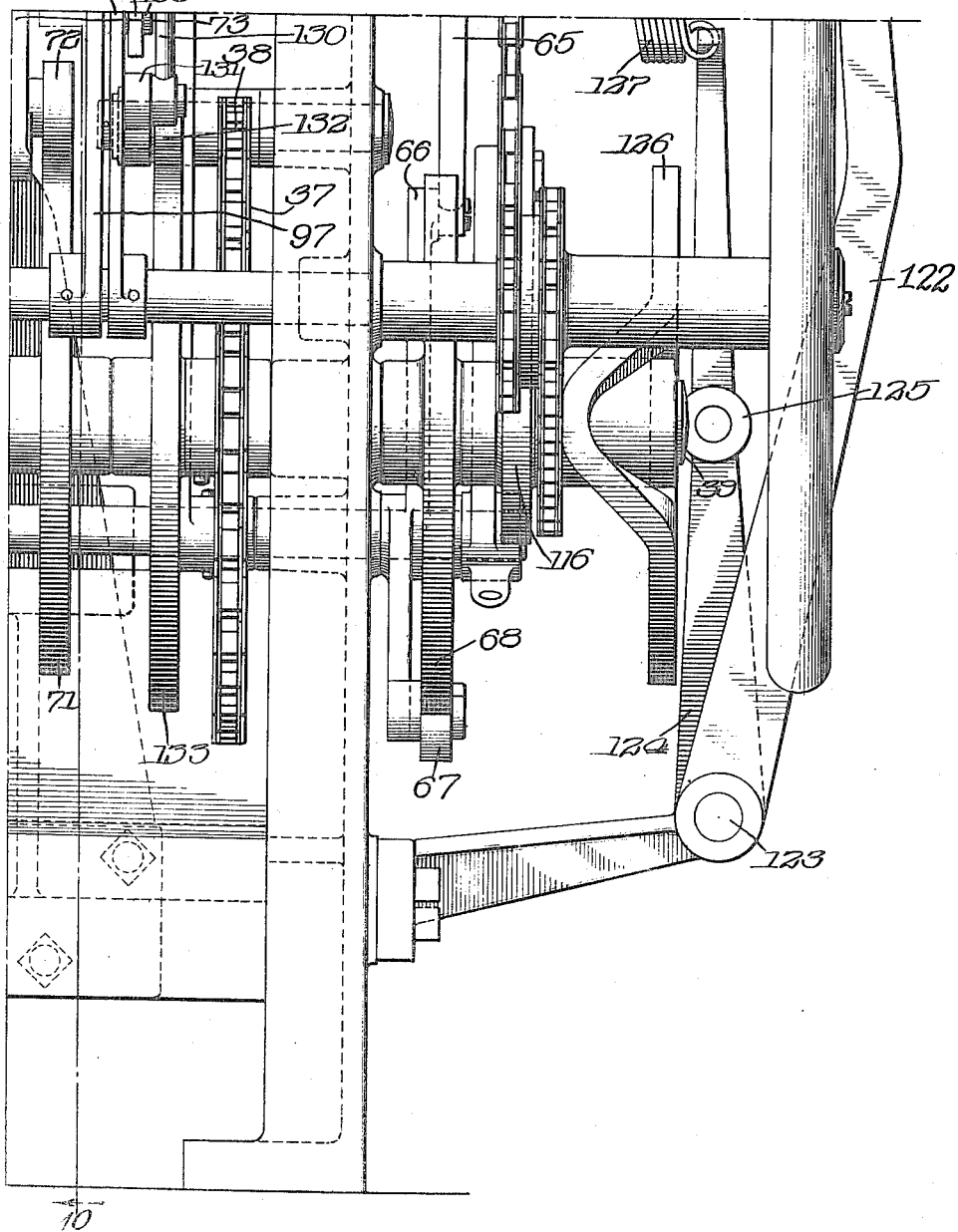

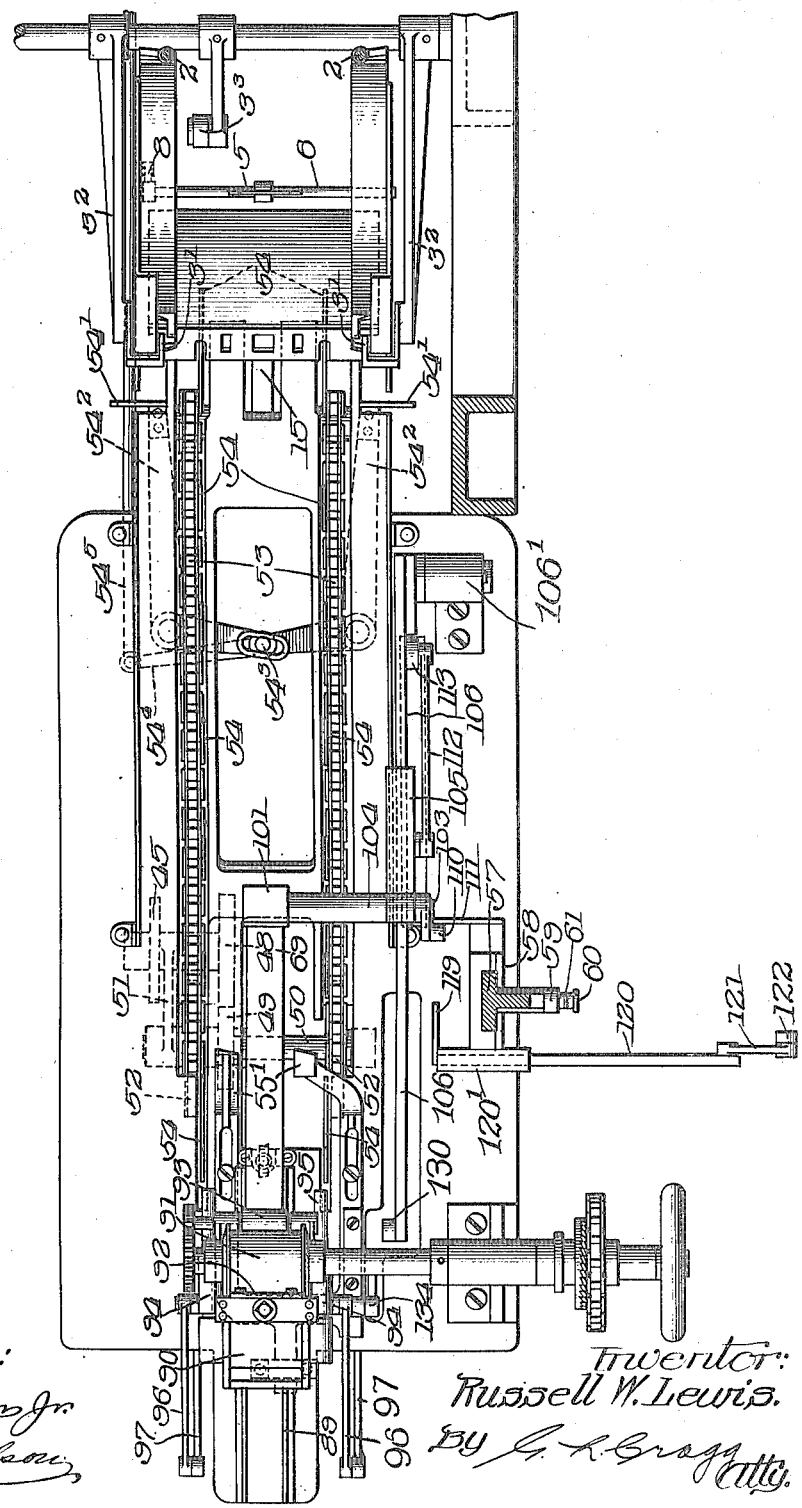

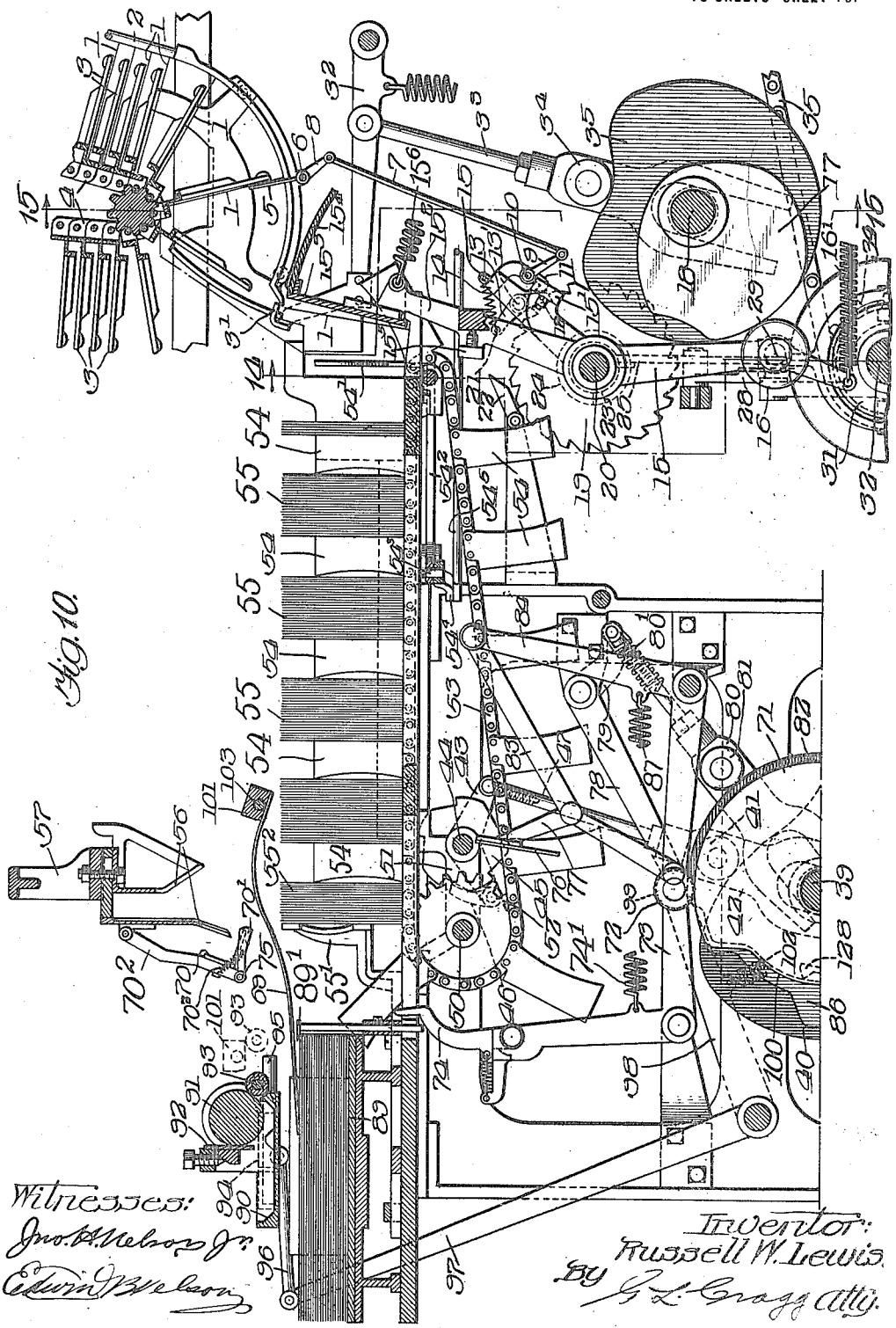

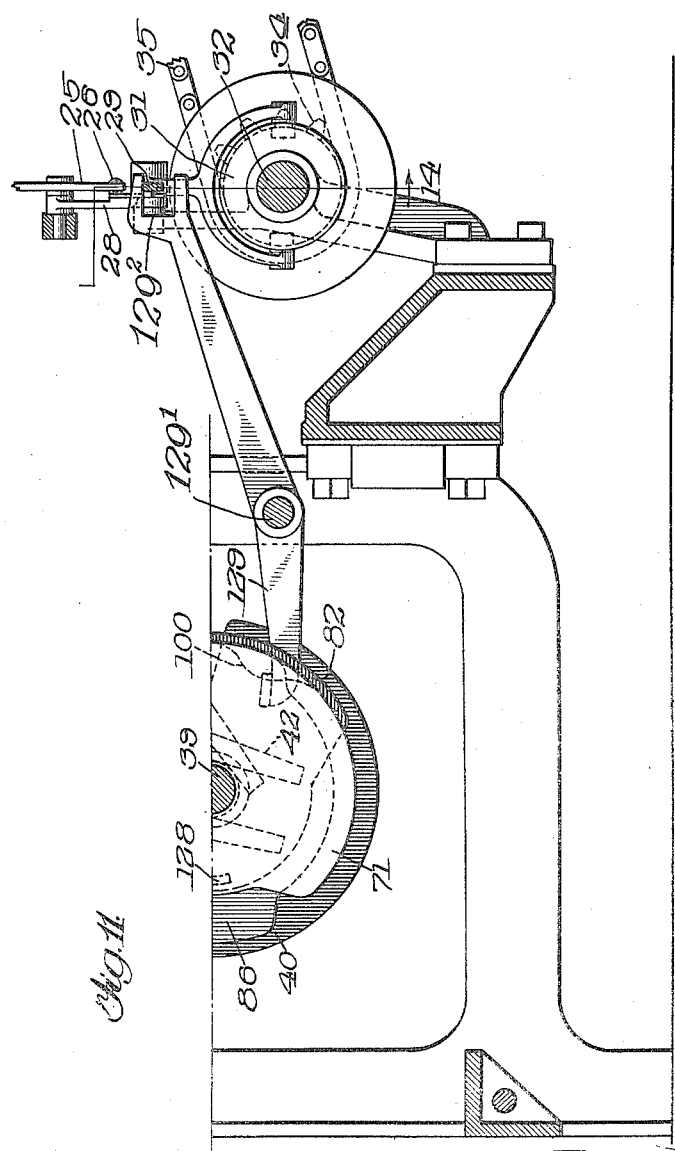

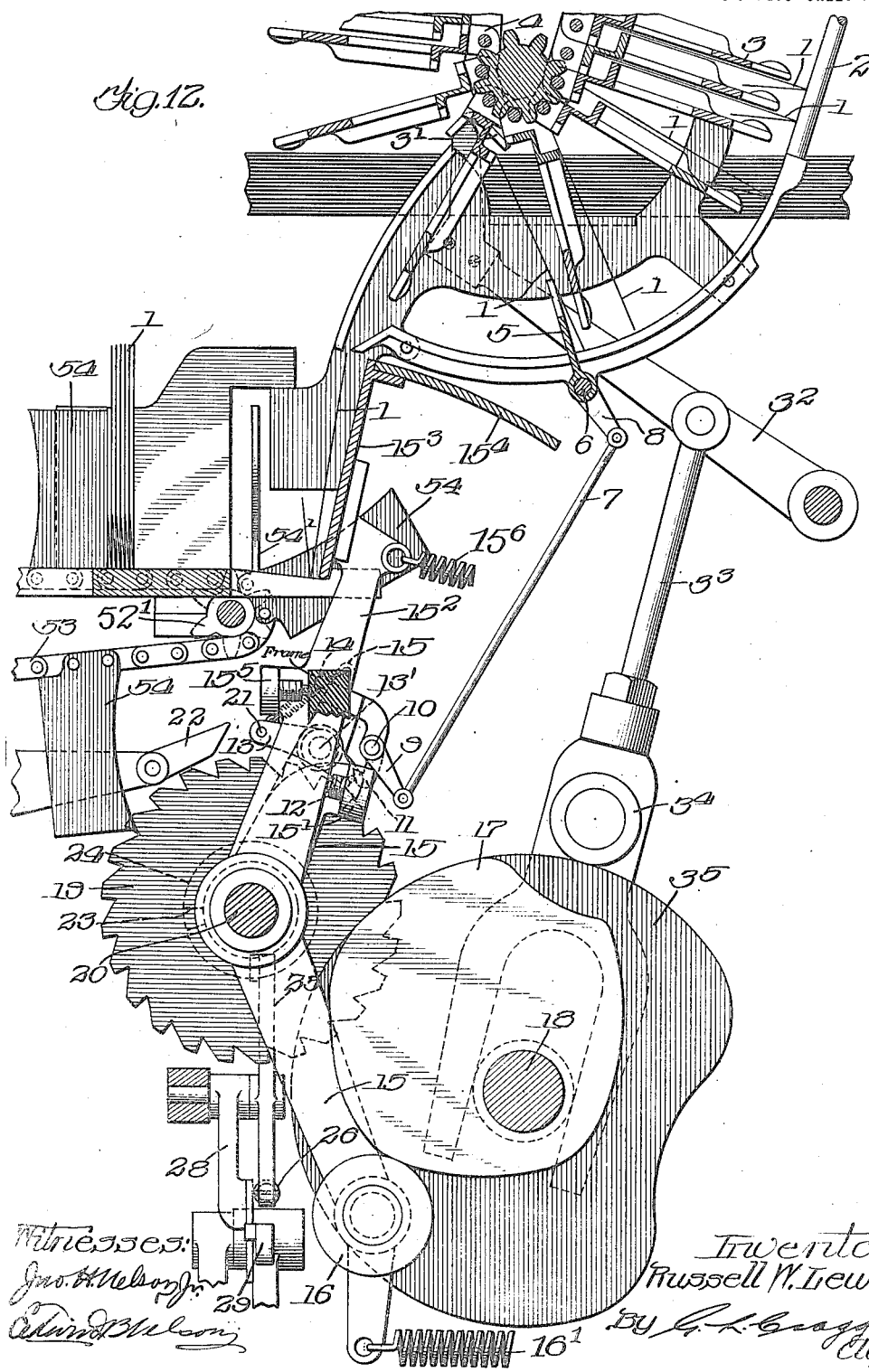

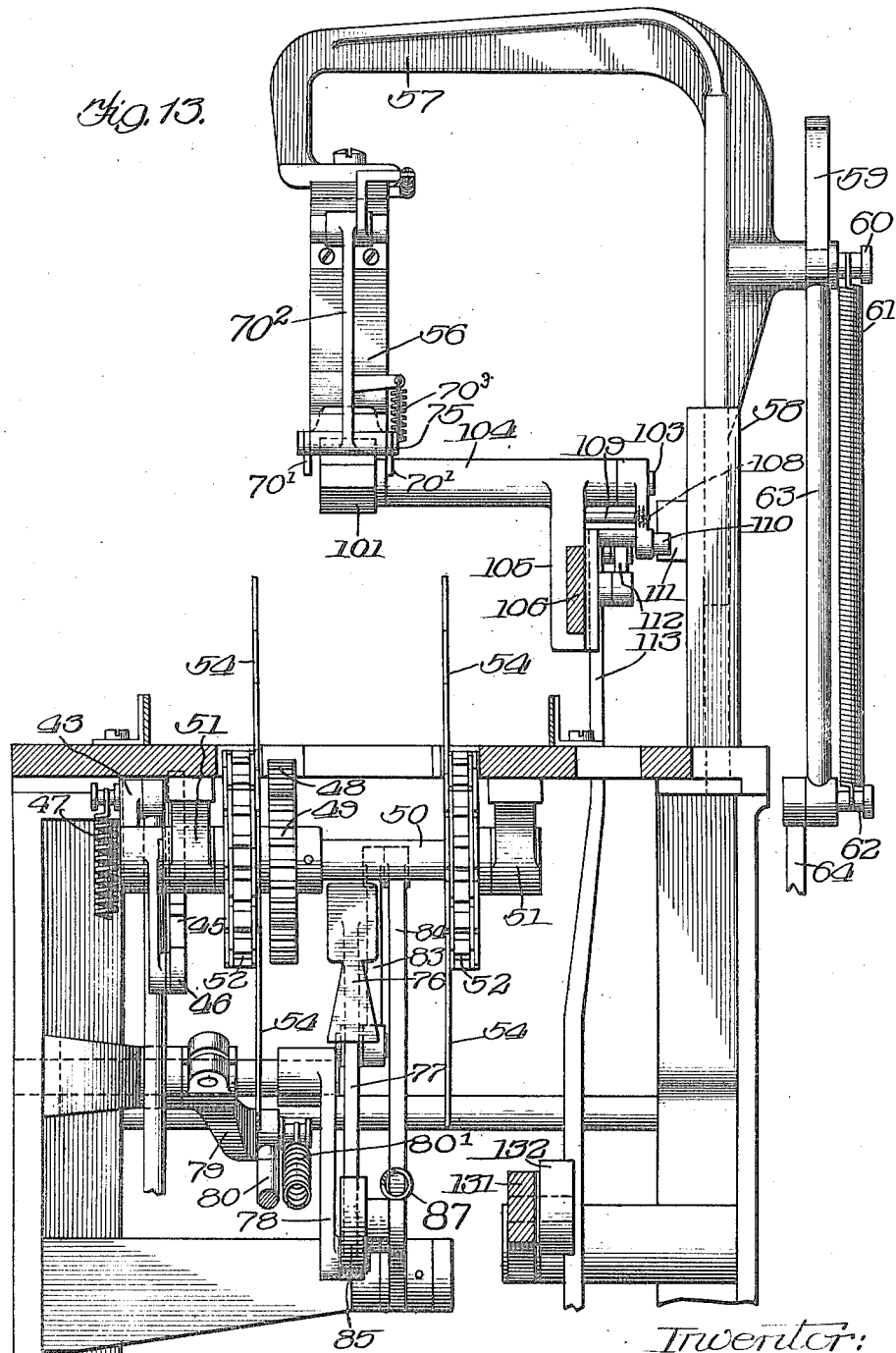

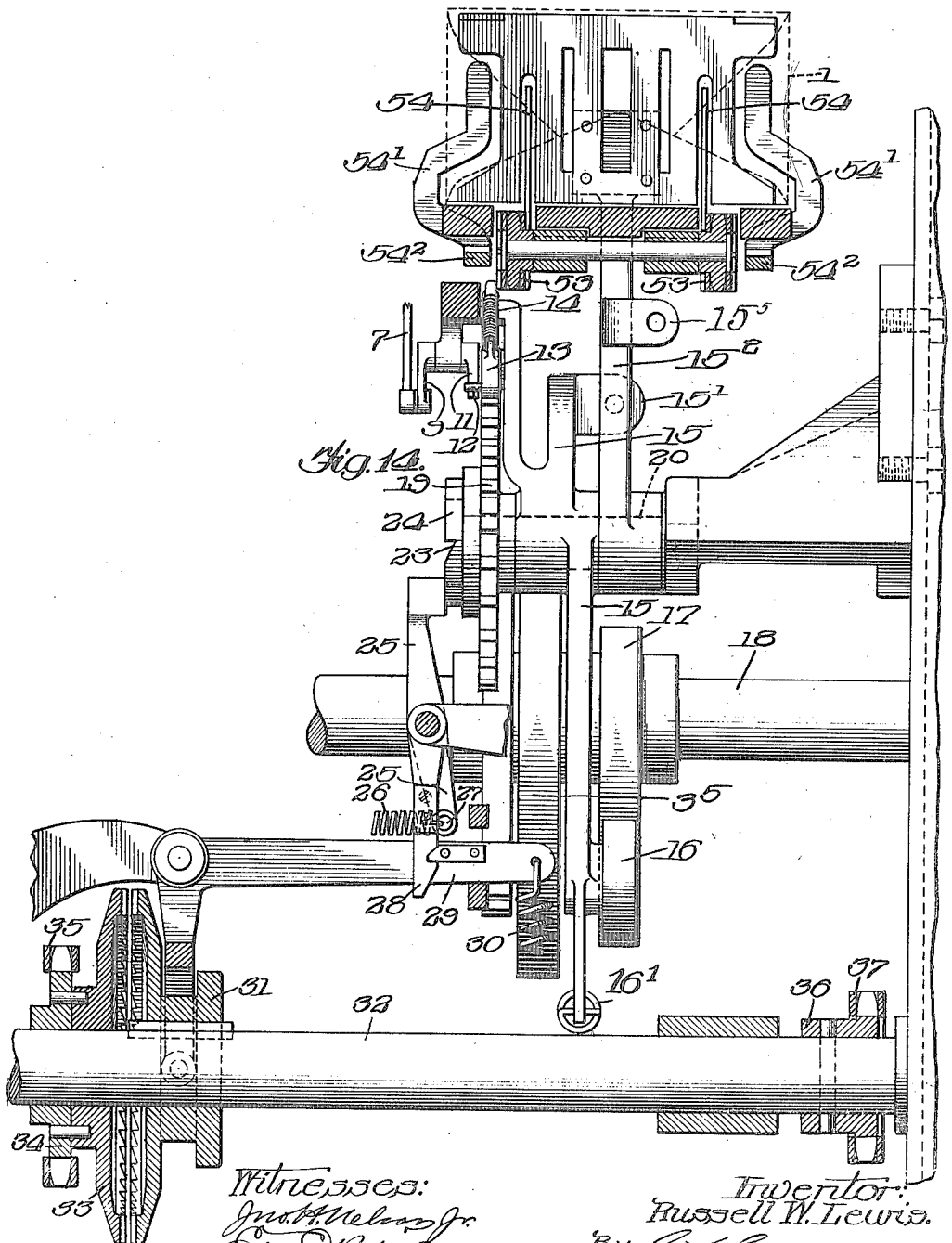

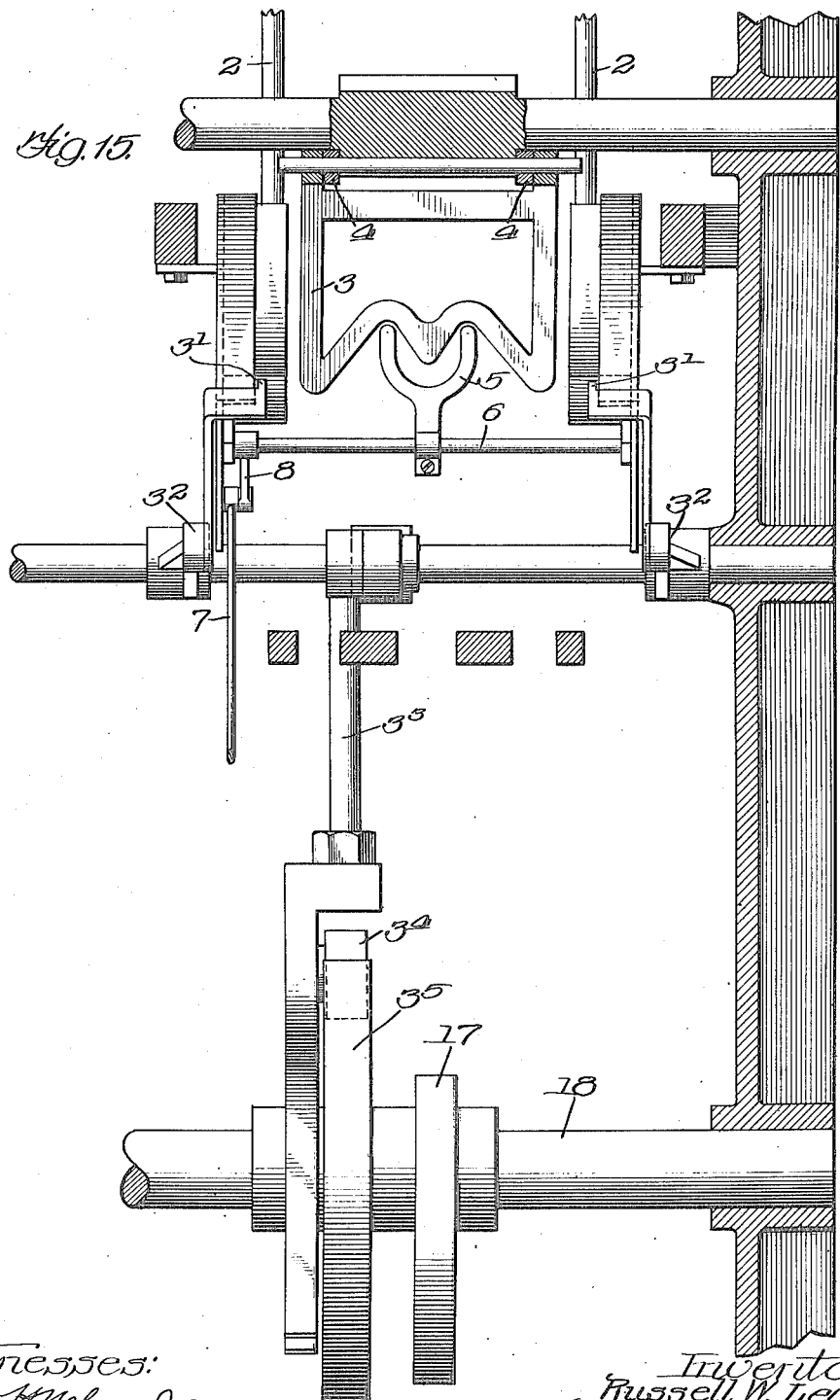

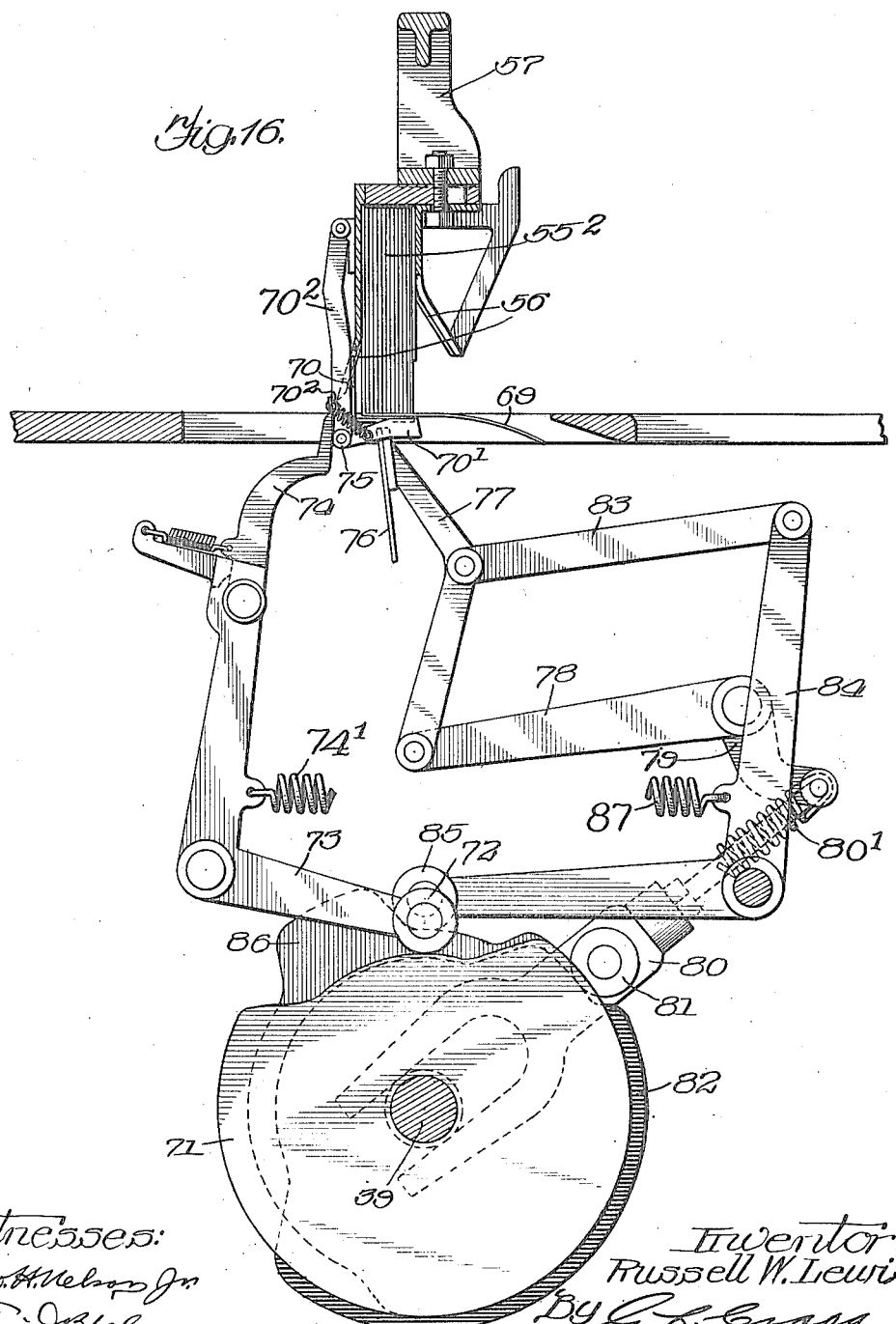

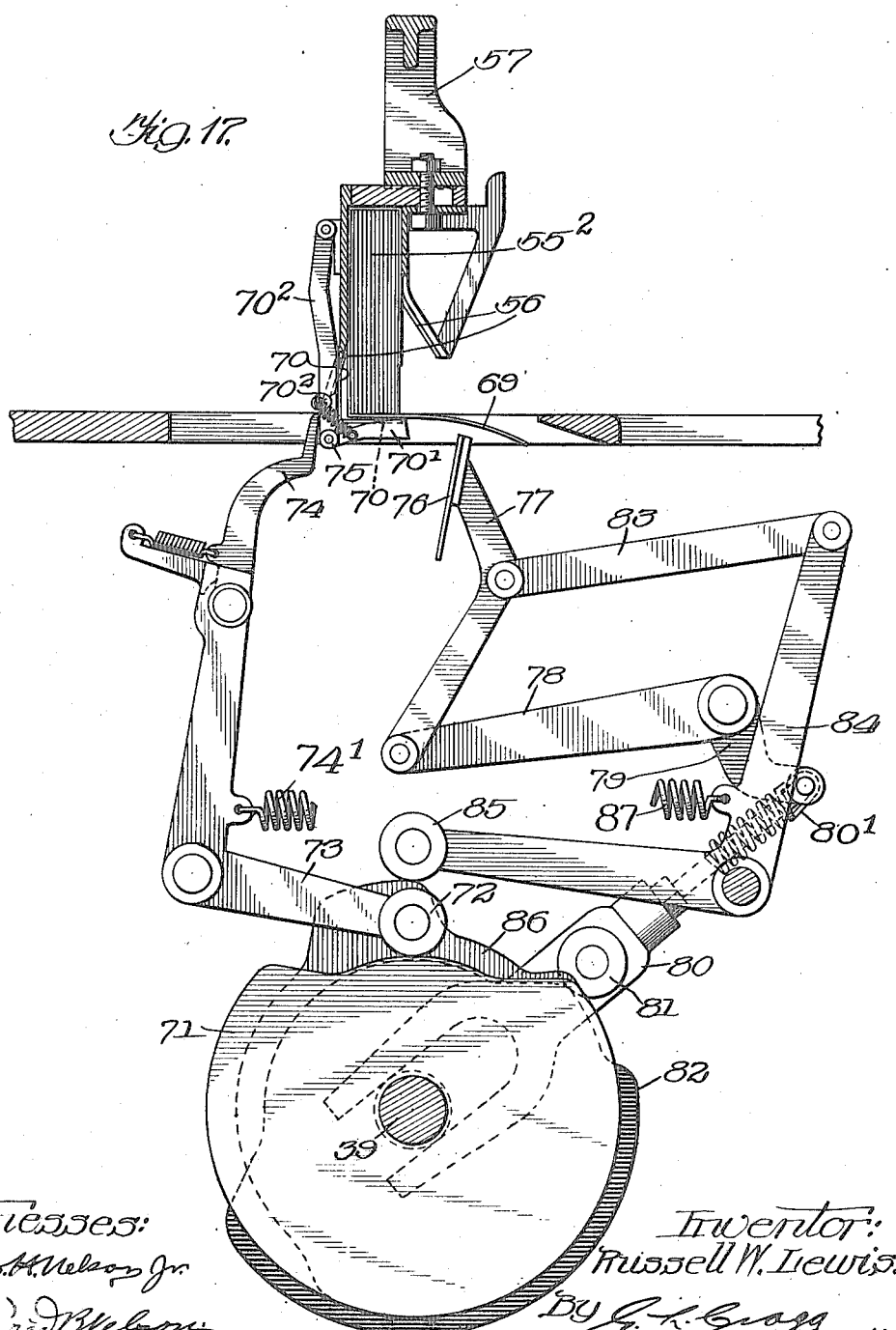

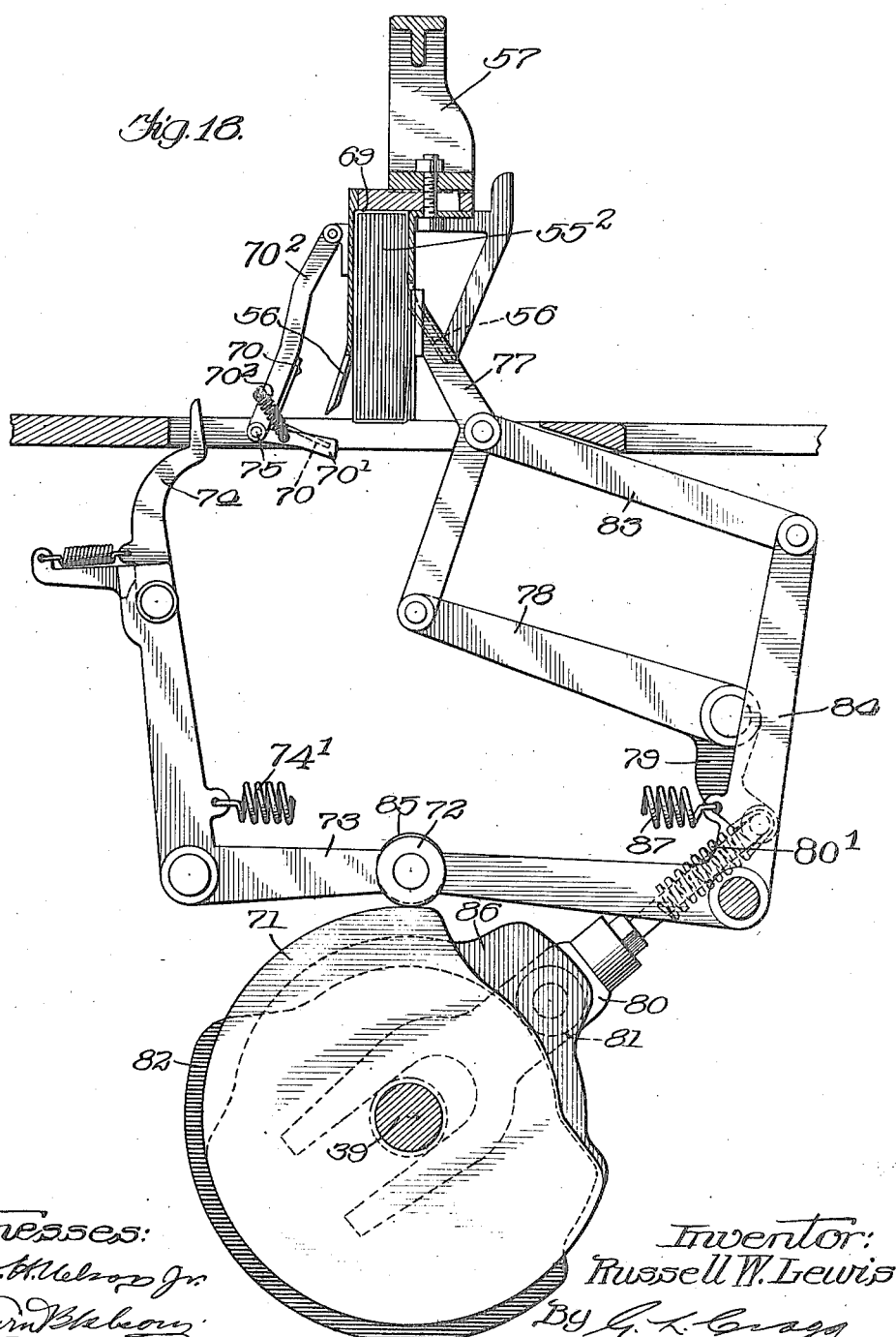

UNITED STATES PATENT OFFICE.

RUSSELL W. LEWIS, OF WAUKEGAN, ILLINOIS, ASSIGNOR TO UNITED STATES ENVELOPE COMPANY, OF SPRINGFIELD, MASSACHUSETTS, A CORPORATION OF MAINE.

ASSEMBLING AND BANDING MACHINE.

1,221,196.  Specification of Letters Patent.  Patented Apr. 3, 1917.

Application filed January 21, 1913. Serial No. 743,338.

*To all whom it may concern:*

Be it known that I, RUSSELL W. LEWIS, a citizen of the United States, residing at Waukegan, in the county of Lake and State of Illinois, have invented a certain new and useful Improvement in Assembling and Banding Machines, of which the following is a specification, accompanied by drawings forming a part of the same.
My invention relates to packaging and banding machines, and in its preferred embodiment is of particular utility in connection with machines that are employed for packaging and banding envelops.
My invention in one of its aspects includes a series of receptacles which are to receive predetermined numbers of envelops or other product units, there being mechanism that successively presents these receptacles to the mechanism that is employed to discharge the envelops, the first aforesaid mechanism being governed in its operation by the envelops themselves so that the envelop receptacles are not caused to travel until the receptacle which is being filled, has received its full quota of envelops. These receptacles are desirably formed in part by conveyer belts or chains and spaced apart receptacle walls which are mounted upon the belts to travel bodily therewith, the spaces between these receptacle walls constituting the envelop receiving spaces and these receptacle walls constituting spacers for keeping the aggregated envelops apart.
My invention in another of its aspects relates to mechanism for forming retaining bands about the groups of envelops or other product units and consists in mechanism for placing strips of paper or other suitable band making material about the groups of envelops and causing the union of the ends of these strips.

In the packaging of envelops the groups thereof are preferably compressed in conformity with the space they are ultimately to fill and while in such compressed state the bands are folded about the same.

Figure 1:
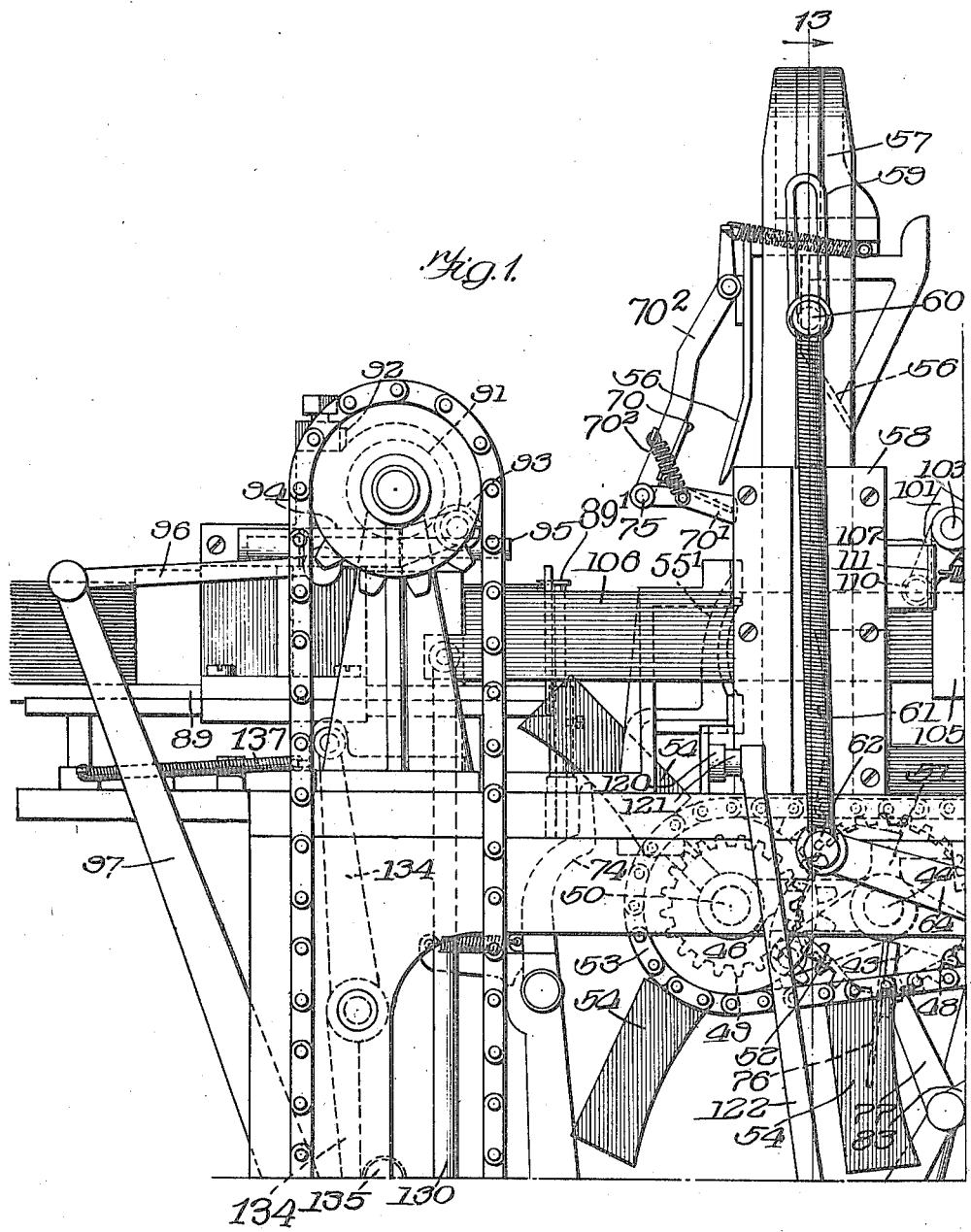

My invention has other characteristics and the various features thereof will be more fully explained by reference to the accompanying drawings showing the preferred embodiment thereof and in which Figures 1 to 4, taken collectively, illustrate the machine, constructed in accordance with one
embodiment of the invention, in side eleva-
tion; Figs. 5 to 8, taken collectively, illustrate the machine in end elevation; Fig. 9 is a plan view illustrating the conveying and gumming mechanism; Figs. 10 and 11, taken collectively, illustrate a side view, partially in section, of certain parts of the mechanism on lines 10—10, of Figs. 5, 6 and 8. Fig. 12 is a view on a larger scale of certain of the mechanism illustrated at the right hand end of Fig. 10; Fig. 13 is a sectional view on line 13—13, Fig. 1, showing part of the mechanism; Fig. 14 is a sectional view on line 14—14 of Figs. 10 and 11; Fig. 15 is a sectional view on line 15—15, of Fig. 10; Fig. 16 is a detail view, in sectional elevation, illustrating a part of the banding mechanism; Fig. 17 is a view of the mechanism shown in Fig. 16 with the parts in another adjustment; and Fig. 18 is a view of the mechanism shown in Figs. 16 and 17 in another adjustment.

Like parts are indicated by similar characters of reference throughout the different figures.

The invention is embodied in an envelop packaging and banding machine and the specific description of such embodiment will refer to such a machine, though it is to be understood that I do not limit myself to the nature of the product units which are grouped and banded. The machine of my invention is desirably coupled with an envelop making machine and has a fixed ratio of operation with respect to the operation of the envelop making machine, the driving mechanism for the two machines being preferably common. The envelops 1, Fig. 10, are discharged from a chain drier that carries these envelops from the envelop making machine, a chute 2 receiving the envelops and along which chute the envelops are fed singly by means of blades 3 carried by and projecting outwardly from an endless feeding belt or chain 4 and upon which blades the envelops rest in their travel in order that they may be dried. The blades 3 are desirably of skeleton formation as illustrated in Fig. 15 and the bottom margins of these blades are inset so that the lower portions of the envelops 1 will project below the said bottom margins, whereby the envelops may singly engage a fork shaped feeler lug or blade 5 which is in fixed relation to a shaft 6. By the construction illustrated, the blades 3 are adapted to carry the envelops

1 past the feeler 5 and the envelops in passing this feeler move the same in a counter clockwise direction so as to turn the shaft 6 in this direction, gravity serving to restore the feeler 5 to that position in which it may be operated upon by a succeeding envelop. The feeler 5 thus depends for its operation upon the presence of an envelop that is being pushed by a blade 3 and if there is no envelop thus being pushed by a blade when it has neared the feeler, the feeler is not operated so that the shaft 6 is not turned. The shaft 6 operates a delay mechanism which is interposed between this shaft and a receptacle conveyer, and when this delay mechanism has been operated upon a number of times equal to the number of envelops to be contained in each package, such delay mechanism effects the coupling of a power device with the envelop receptacle conveyer for the purpose of removing one group of envelops from alinement with the chute 2 and presenting a receiving space for another group of envelops in alinement with this chute. The delay mechanism, which is operated by the shaft 6, includes a link 7 joined at one end to an arm 8 fixed upon the shaft 6 and at its other end to an arm 9, attached to a short rocking shaft 10, Fig. 12. A hooked latch 11 (Fig. 14) attached to the rocking shaft 10 engages a pin 12 carried upon the free end of an actuating pawl 13 and holds the free end of the pawl 13 in an elevated position when the shaft 6 and envelop feeler 5 are in idle position. The movement of the feeler 5 by the passage of an envelop, rocks the shafts 6 and 10 and moves the latch 11 away from the pin 12, thereby allowing the free end of the pawl 13 to be carried into engagement with a ratchet wheel 19 by means of a spring 14 connecting the opposite end of the pawl with the upper arm of a bell crank lever 15, upon which the pawl 13 is pivotally mounted at 13'.

The bell crank 15 carries at its lower end a cam roller 16 held in contact by a spring 16' with a cam 17 on a shaft 18 which is the main driving shaft of the machine to which power is applied. The bell crank 15 swings on a fixed stud 20 on which the ratchet wheel 19 is loosely journaled. The upper arm of bell crank 15 carries a pusher $15^1$ arranged to engage an arm $15^2$ journaled loosely on the stud 20. The upper end of the arm $15^2$ carries a pushing plate $15^3$ having attached to its upper edge a guard plate $15^4$ that prevents an envelop from falling from the chute 2, until the pushing plate has been withdrawn to its right hand position. The arm $15^2$ has a lug $15^5$ carrying an adjusting screw arranged to contact with the fixed framework and limit the swinging movement of the arm $15^2$ toward the right as actuated by a spring $15^6$, Fig. 12.

The number of teeth in the ratchet wheel 19 equals the desired number of envelops to be contained in each group or package, in the present instance, twenty-five. At each swinging movement of the bell crank 15 the ratchet wheel 19 is moved one tooth, provided the actuating pawl 13 has been released from the hooked latch 11 by the passage of an envelop past the feeler 5. When no envelop is delivered from the chute 2, the feeler 5, hooked latch 11 and connecting parts are held by gravity to maintain the latch 11 in position to engage the pin 12 and hold the pawl 13 out of engagement with the ratchet wheel 19. As the bell crank 15 is swung in a counter clockwise direction by the spring 16', a pin 21 carried by the pawl 13 is brought into contact with a stationary cam 22 held by the framework of the machine, which rocks the pawl 13 to carry the pin 12 into engagement with the hooked latch 11, causing the pawl 13 to be held in an inoperative position until released from the latch 11 by the passage of an envelop past the feeler 5.

The ratchet wheel 19 is provided on one side with a flange 24, Fig. 14, having a notch 23 which, when the ratchet wheel has made a complete revolution upon the passage of twenty-five envelops past the feeler 5, is brought vertically beneath the axis of the ratchet wheel. In this position the notch 23 is presented to the upper end of a pivoted rocker arm 25 which is moved into the notch by the tension of a spring 26 applied to the lower end of the rocker arm. The lower end of the rocker arm carries a pin 27 which contacts with a swinging latch 28 pivoted concentrically with the rocker arm 25 and normally engaging a clutch actuating bell crank lever 29. The rocking movement of the arm 25 upon the grouping of each twenty-five envelops swings the latch 28 and disengages it from the clutch actuating lever 29, which is then moved by the tension of a spring 30 to slide a clutch 31, having a spline connection with a shaft 32, into engagement with a constantly rotating clutch member 33 having an attached sprocket wheel 34, driven by a chain connection 35 from a sprocket wheel, not shown, having a fixed ratio of rotation to the main driving shaft 18.

The mechanism above described, comprising the feeler 5, cam 17, ratchet wheel 19, and pusher plate $15^3$ constitutes a counting mechanism which operates in conjunction with the clutching members 31 and 33, to bring the shaft 32 into operative connection with the driving mechanism whenever twenty-five envelops have been assembled.

The rotation of the shaft 32 sets in operation mechanism for moving the assembled group of twenty-five envelops by a step-by-step movement from their position in front of the pusher plate $15^3$ to a position in which the assembled envelops are compressed and a band applied. The rotation of the shaft 32 likewise actuates the mechanism for banding the envelops and discharging the bound bunch from the machine as will appear from the description hereinafter contained.

Figure 3:
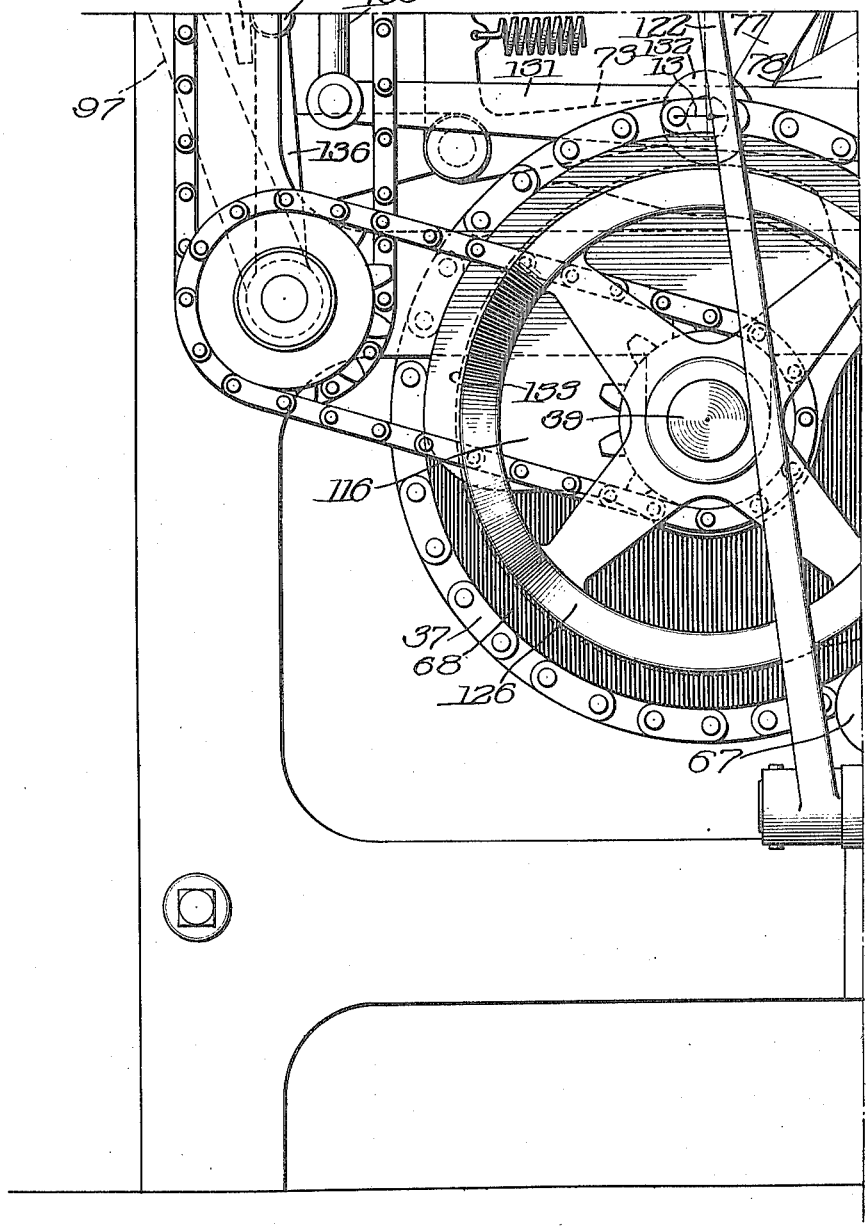
Figure 4:
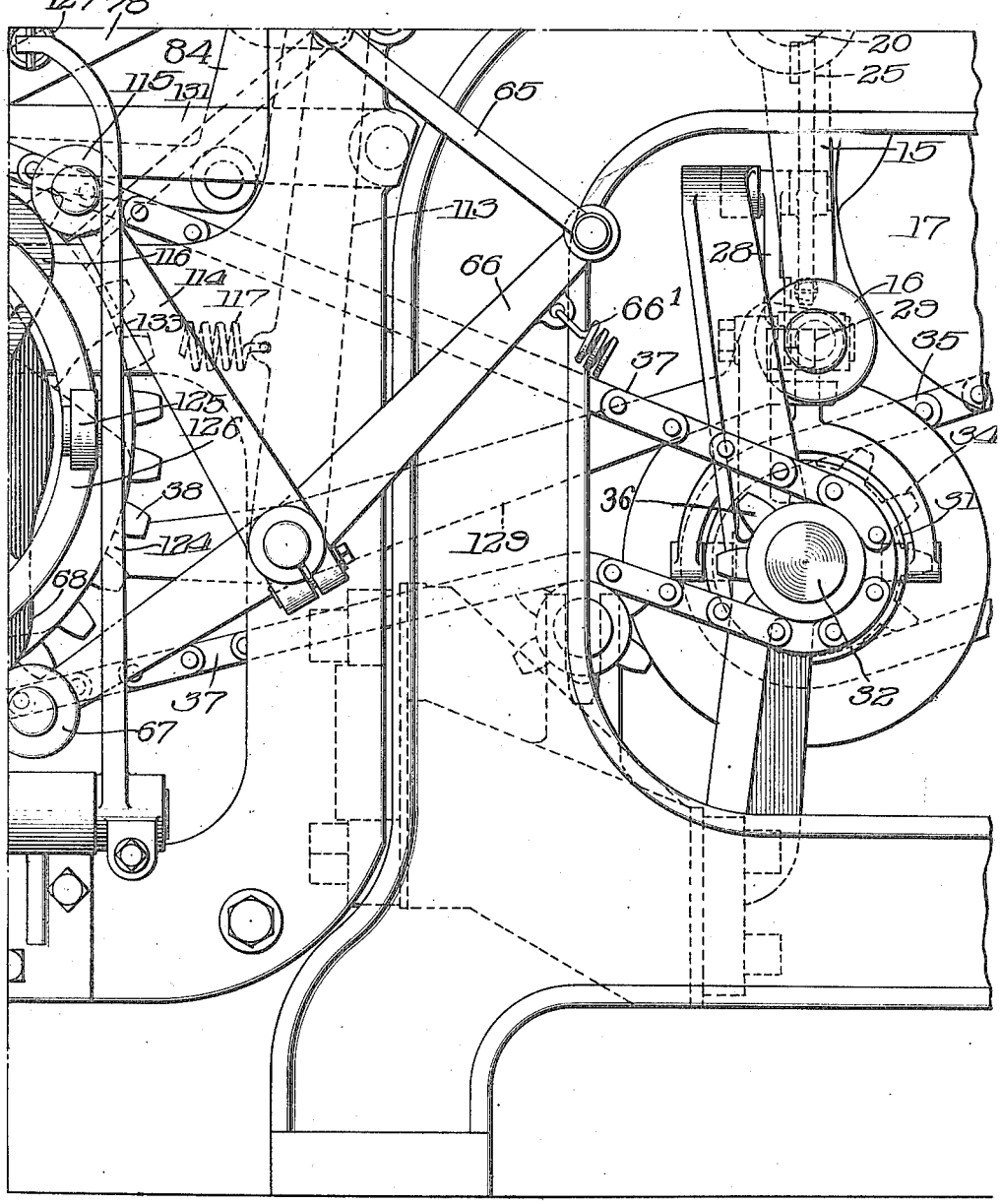
Figure 5:
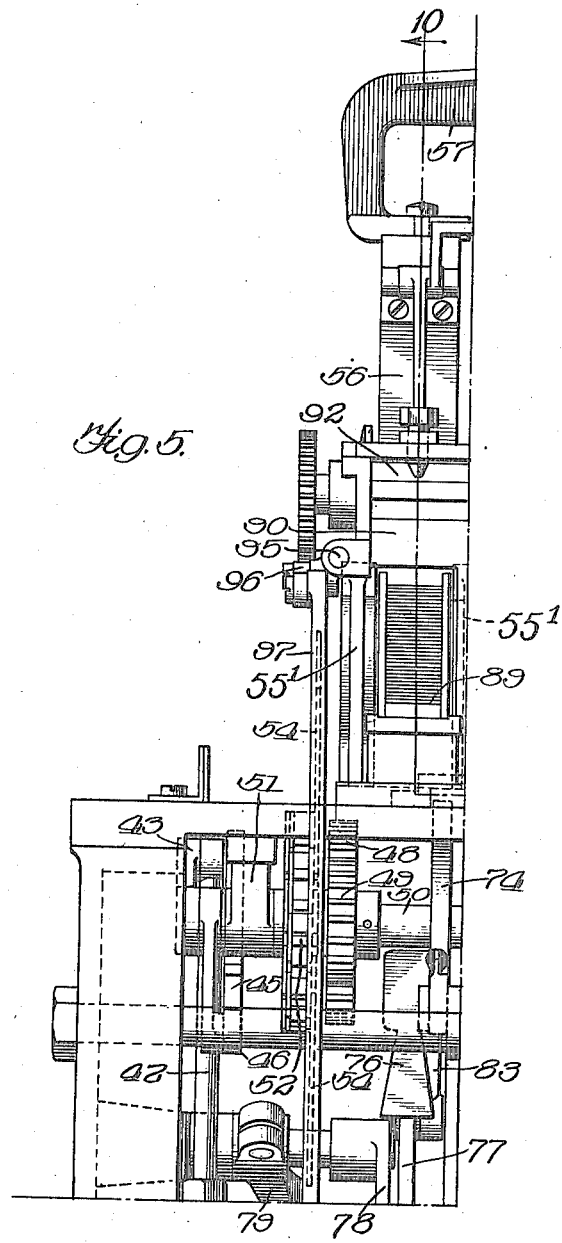

A sprocket wheel 36, Fig. 4, carried by the shaft 32 is connected by a chain belt 37 with a sprocket wheel 38 attached to a shaft 39, Fig. 3. The shaft 39 carries a cam 40, one half of which is shown in Fig. 10 and the other half in Fig. 11. The cam 40 acts upon a cam roll 41, Fig. 10, pivoted on the side of a link 42 which is bifurcated at its lower end to straddle the shaft 39, and connected at its upper end with one end of a bell crank lever 43, pivoted on a shaft 44, to which is attached a ratchet wheel 45. The other arm of the bell crank lever 43 carries a pivoted spring pressed pawl 46 arranged to engage the ratchet wheel 45 and move it and the shaft 44 intermittently the space of a single tooth at each oscillating movement of the bell crank lever 43, as actuated by the cam 40 and a spring 47 applied to hold the cam roll 41 in contact with the cam 40, Fig. 10. The shaft 44 has a geared connection through gears 48 and 49, with a shaft 50, Fig. 1, journaled in brackets 51, Fig. 13, attached to the framework of the machine.

Attached to the shaft 50 are two sprocket wheels 52, which drive, with an intermittent motion, the sprocket chains 53, 53, supported on the sprocket wheels 52 and the small idler sprocket wheels 52¹ at the right hand end of the machine, Fig. 12.

Attached to the sprocket chains 53 and equally spaced thereon are finger plates 54. The plates on one chain are in transverse alinement with the plates on the other chain, constituting pairs with intervening spaces to receive the groups 55 of envelops, in the present instance, twenty-five in number. The chains 53 are moved intermittently at each rotation of the shaft 39 and as they pass in a horizontal plane from the small sprocket wheels 52¹ to the driving sprocket wheels 52 the plates 54 are brought into a vertical position and are moved by a step-by-step motion the distance of an intervening space, carrying each group 55, of twenty-five envelops, from the envelop receiving ends of the chains until the advancing group has been brought against a stop 55¹. The stops 55¹ are placed nearer the advancing edge of the foremost plate 54 than the width of the spaces between the plates 54 as they are moved across the horizontal stretches of the chains 53, thereby causing each group of envelops 55, as they are brought against the stops 55¹ to be compressed, as shown at 55², Fig. 10, for the purpose of facilitating the still further compression of the group of envelops preparatory to the application of a band thereto as hereinafter described.

To insure the transference of the envelops from the chute 2 into the receiving spaces on the chains 53, I employ a pair of fingers 3¹ which engage the upper edge of an envelop as it is brought into proper position by the blades 3 as shown in Fig. 12. The fingers 3¹ are mounted upon one end of a lever 3² pivoted at its opposite end upon the framework of the machine and pivotally connected between its ends to a link 3³ carrying a cam roll 3⁴ held by gravity upon the periphery of a cam 3⁵ carried upon the shaft 18, which allows the fingers 3¹ to drop at the proper moment into the position shown in Fig. 10, making it certain that the envelop will be pulled downward in front of the pusher plate 15³ by which the envelops are pushed forward upon the chains 53. The accidental return of the envelops is prevented by fingers 54¹, Fig. 10, which are mounted on the right hand ends of bell crank levers 54², Fig. 9, having a pin and slot connection at 54³, Fig. 9, to insure the simultaneous movement of the fingers 54¹. An extension at 54⁴ upon one of the bell crank levers is pivotally connected to a rod 54⁵ which is actuated at proper intervals by means of a cam, not shown, to swing the bell cranks 54² to separate the fingers 54¹ to allow an envelop to be advanced by the pusher plate 15³, and to bring the fingers 54¹ toward each other in order to prevent the return of the envelop. In the latter position, the fingers 54¹ are represented in front elevation in Fig. 14.

Each successive group of twenty-five envelops is brought against the stop 55¹ and partially compressed, as shown at 55² in position to receive a band and to be discharged from the machine.

The banding mechanism comprises a pair of folder and presser plates 56 shown in their relation to the envelop carrying chains 53 in Fig. 10, and upon a larger scale in Figs. 16, 17 and 18. The folder plates 56 are mounted upon the overhanging arm of a vertically reciprocating plunger 57, Fig. 13. The upper portions of the plates 56 are parallel and vertical, while the lower portions are divergent to enable them to slide the more easily over the assembled envelops 55² and said plates are adjustably connected with the plunger 57 to enable the space between the plates to be varied according to the desired thickness of the banded bunch of envelops.

Figure 6:
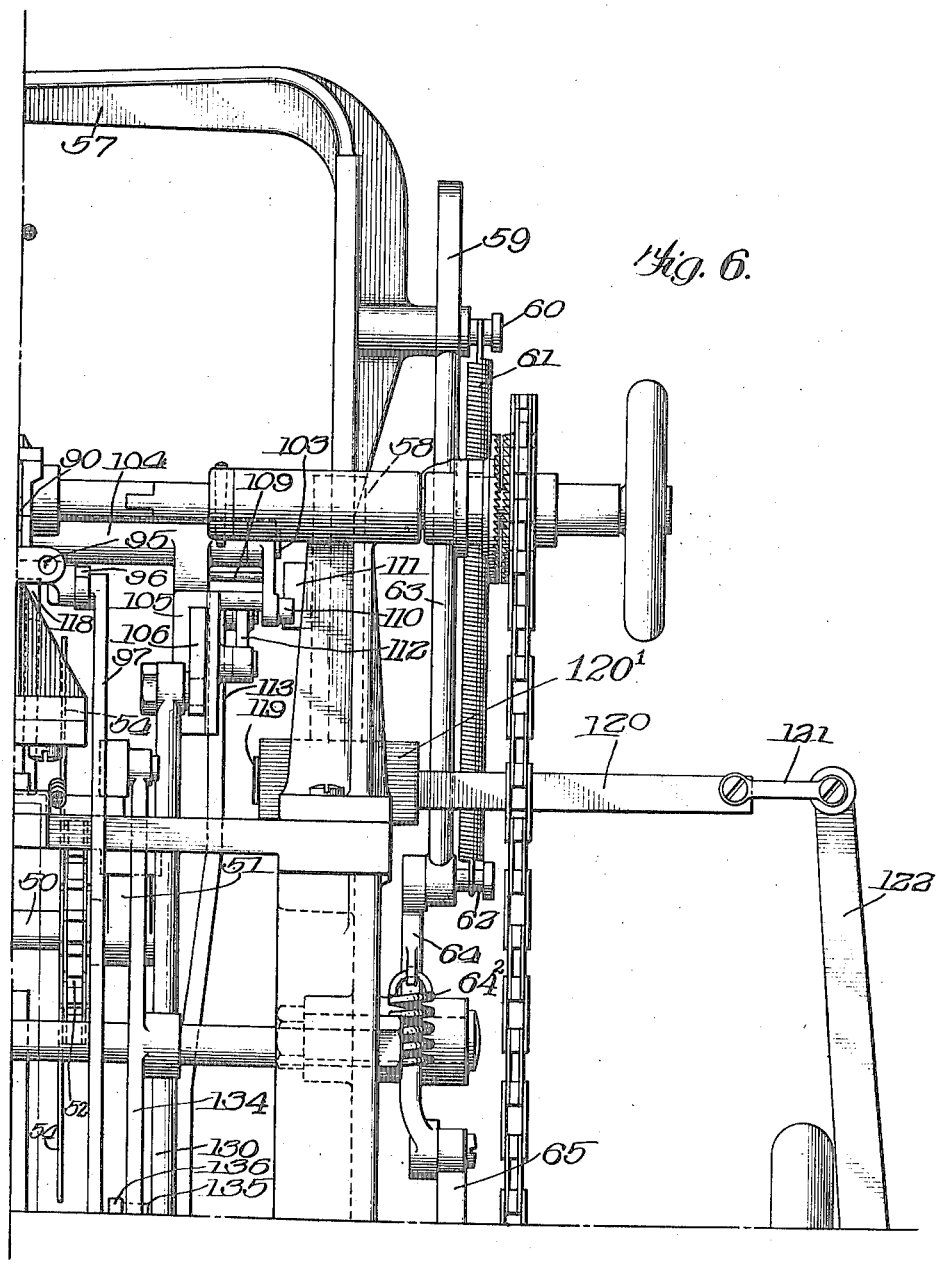

The plunger 57 slides in vertical ways 58, Figs. 1, 6 and 13, and is provided with a projecting screw 60 which passes through the slotted upper end 59 of a link 63, the screw 60 being normally held at the bottom of the slot by the tension of a spring 61 which connects the screw 60 with a screw 62 carried by the link 63. The link 63 is pivoted to the free end of a lever 64, which is pivoted at its opposite end to the framework of the machine, Figs. 2 and 6. Depending from the lever 64 is a short arm 64¹, Fig. 2, which is pivotally connected by a link 65 with the upper end of a lever 66, Fig. 4, pivoted between its ends on the framework and carrying at its lower end a cam roll 67 held in contact with the periphery of a cam 68, carried on the shaft 39, by means of a spring 66¹ applied to the lever 66 and a spring 64² applied to the lever 64. The rotation of the cam 68, at the proper period in the operation of the machine, depresses the plunger 57 and folder plates 56 to carry the latter downward over the upper edges of the group 55² of envelops, as shown in Figs. 16, 17 and 18, said plates having been adjusted to give the desired compression to the envelops, which will vary according to the proposed compactness or thickness of the bunches when banded.

Between the folder plates 56, when in their raised position, and the group 55² of envelops, a strip 69 of band paper is interposed, gummed on one end. The strip 69 is folded around the group 55¹ of envelops and its ends united and the banded bunch of envelops ejected from the machine by mechanism hereinafter described.

Pivoted upon one of the plates 56 is a bar 70² to which is attached an angular folding plate 70 occupying the position shown in Fig. 10, before the plunger 57 is depressed. After the depression of the plates 56 the lower member of the angular plate 70 is forced beneath the lower edge of the group 55² of envelops into the position in Fig. 16 by means of a spring 74¹ applied to a bell crank lever 73 to carry its upper tripping end 74 against a pin 75 carried by the lower end of the bar 70², the action of the spring 74¹ being controlled by a cam 71 on the shaft 39 acting against a cam roll 72 on the bell crank 73. The downward movement of the plates 56 folds the interposed band strip 69 around the upper edges of the bunch of envelops and the sidewise movement of the angular folding plate 70 folds the band strip 69 beneath the lower edges of the envelops, as shown in Fig. 16.

During the action of the angular folding plate 70 the band is held from sidewise displacement by a pair of side plates 70¹, Fig. 13, spaced apart slightly more than the width of the band strip 69 and pivotally supported on the lower end of the bar 70² and yieldingly held in their highest position by a spring 70³. When the band 69 has been folded across the lower edges of the envelops, as shown in Fig. 16, another folding plate 76 is brought into action to bring the band 69 into the position shown in Fig. 18, with the two ends of the band overlapping.

The folding plate 76 is carried upon the upper end of a bent arm 77, Figs. 16 and 13, to the lower end of which is pivoted an arm 78 having a fixed axis. In fixed relation to the arm 78 and having a common axis is an arm 79 to which is pivoted a link 80, forked at its other end to straddle shaft 39 and carrying a cam roll 81 held in contact with a cam 82 on said shaft by a spring 80¹. At the bent portion of the arm 77 it is connected by a link 83 with the upper arm of a bell crank 84 pivoted upon the framework and carrying on its lower arm a cam roll 85, which is held against the periphery of a cam 86 on shaft 39 by a spring 87.

By the action of the cams 82 and 86 the folding plate 76 is moved from the position shown in Fig. 16 to that shown in Fig. 17, when an upward and a sidewise movement is given the plate 76, moving it into the position shown in Fig. 18.

During this last movement of the plate 76 it causes the ends of the band 69 to overlap and become securely attached. The plunger 57 is raised into the position shown in Fig. 10 but the plates 70 and 76 are maintained in the positions shown in Fig. 18 while the ratchet wheel 19 has nearly made a complete revolution and another group of twenty-five envelops is being carried into a space on the carrier chains 53, 53, thereby holding the overlapping ends of the band in close contact until the gum between the ends securely unites them.

A stack of paper band strips is held in a magazine 89, Fig. 10, each of the right length to form an inclosing band with overlapping ends around a bunch of envelops. A gum box 90 is mounted above the magazine 89 of band strips, with the usual rotating gum roll 91, commonly used in envelop machines, partly immersed in the gum and provided with a scraper 92. Rotating in contact with the gum roll 91 is a gumming roller 93, which is journaled in a carriage 94 slidable on ways 95, by means of a link 96, levers 97 and 98, and a cam roll 99, Fig. 10, held in contact with a cam 100, Figs. 7 and 10, upon the shaft 39 by a spring 102, Fig. 10, causing a traversing motion to be imparted to the gumming roller 93 in contact with the under surface of a gumming picker 101. The picker 101 after being gummed is moved downward into contact with the end of the uppermost band in the magazine 89. The picker 101 is then raised to remove the attached band from beneath a separator 89¹ such as is commonly used in envelop machines, and advanced to the position shown in full lines in Fig. 10, in which position the picker 101 is slightly rocked to bring its under surface into an inclined position in order to facilitate the stripping of the band 69 therefrom by the descent of the folding plates 56.

After the folding plates 56 have been raised into the position shown in Fig. 10, the picker 101 is returned to the position shown by the broken lines in Fig. 10, preparatory to another application of gum by the gum transferring roller 93.

In order to actuate the picker 101 as above described, I mount the picker upon one end of a short shaft 103, Figs. 1 and 13, journaled in an extension 104 of a slide 105, capable of being reciprocated on a guide bar 106. The shaft 103 carries at its opposite end a short arm 107, to which a spring 108 is applied to hold the arm 107 against a stop 109, Fig. 2, maintaining the picker 101 in the position indicated by broken lines in Fig. 10. When the slide 105 is moved to the right, carrying the picker 101 into the position shown by full lines in Fig. 10, a roller 110 on the free end of the arm 107 strikes a stationary plate 111, interposed in the path of the roller, thereby rocking the shaft 103 to tip the picker 101 and depress its advancing edge as shown in Fig. 10.

Figure 2:
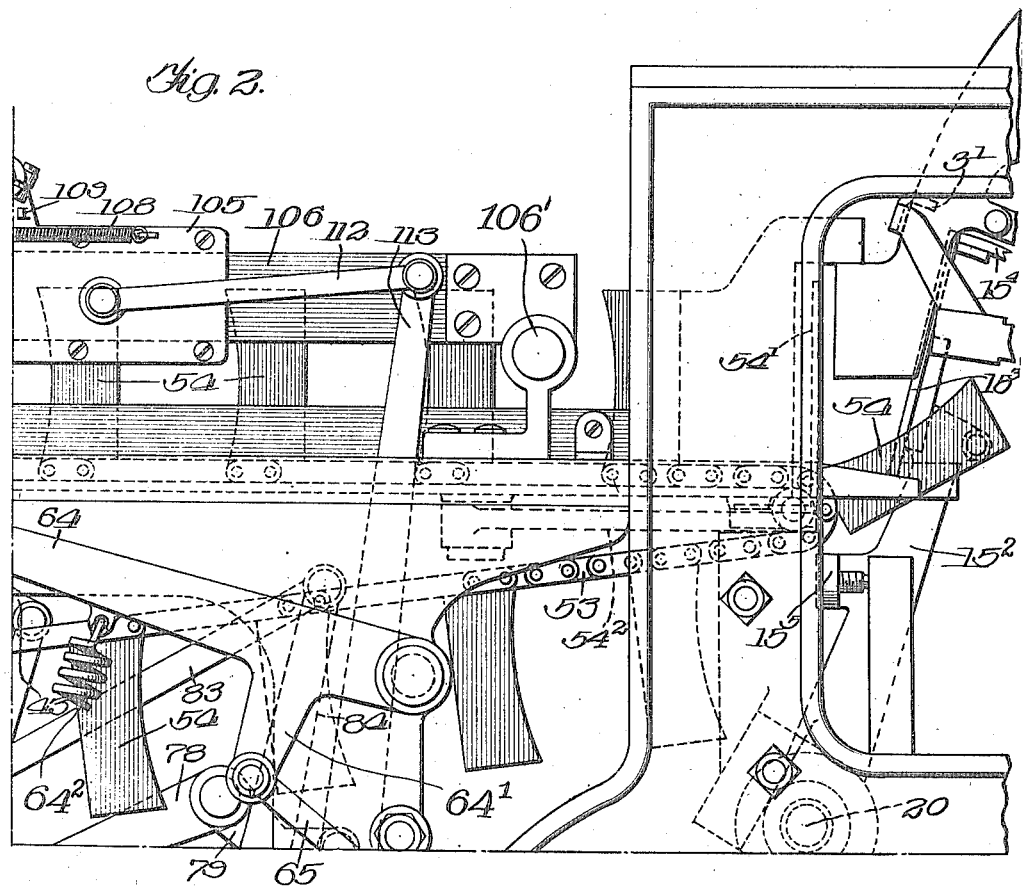

The slide 105 is reciprocated on the guide bar 106 by a link 112, connecting the slide 105 with the upper end of a lever 113, Figs. 2, 4 and 9, having an arm 114, Fig. 4, held in fixed relation thereto and provided with a cam roll 115 which is held in contact with a cam 116 on shaft 39 by a spring 117, Fig. 4. In order to enable the picker 101 to descend and pick up a band the guide bar 106 is pivoted at its right hand end in a bearing 106¹, Figs. 2 and 9. The left hand end of the guide 106 is pivoted to a link 130, Figs. 1 and 6, by which the guide 106 is connected with the end of a lever 131, Fig. 3, pivoted at its opposite end upon the framework and carrying a cam roll 132 in contact with a cam 133 on the shaft 39, Fig. 3. The cam 133 controls the up and down movements of the picker 101, raising it in position to coöperate with the gum transferring roll 93, allowing it to descend into contact with the end of a band and to be elevated to withdraw the end of the band adhering thereto from beneath the separator 89¹.

After the banding of the bunch of envelops has been completed, the stop 55¹ is moved toward the left in order to free the banded bunch of envelopes and permit it to be ejected from the machine. To free the bunch I pivot the tail of the stop 55¹ to the upper end of a lever 134, Fig. 1, said lever 134 being pivoted to the framework midway its length, and having its lower end bearing against a roll 135 pivoted on the upper end of a lever 136, Fig. 3. The lever 136 is attached to a short rocking shaft to which the lever 97 and arm 98 are attached. Whenever the arm 98 and lever 97 are actuated by the cam 100 running against the cam roll 99, the lever 136 is likewise actuated either to move the stop 55¹ to the right into operative position, or to permit the stop to be moved to the left to release the bunch of envelops by means of the spring 137, Fig. 1.

The mechanism for ejecting the banded bunch of envelops comprises a pusher 119, Figs. 6 and 9, carried upon the inner end of a bar 120 capable of sliding in ways 120¹ transversely to the machine. The bar 120 is connected by a link 121 with the upper end of a lever 122 which is attached at its lower end to a rocking shaft 123, Fig. 8. Extending radially from the rocking shaft 123 is an arm 124 carrying a cam roll 125, which is held against the side of a cam 126 by a spring 127, Fig. 8. The cam 126 is adapted to permit the spring 127 to force the pusher 119 against the banded bunch of envelops at the period when the stop 55¹ has been withdrawn, the cam 126 reversing the movement of the pusher and holding it in an inoperative position during the operation of banding the succeeding bunch of envelops.

All the operations of the machine are performed during the period the clutch members 31 and 33 are in engagement and during a revolution of the cam shaft 39. At the end of the cycle of operations required to band and eject a bunch of envelops the clutch members 33 and 31 are automatically disengaged by a lug 128, carried on the side of the cam 40 on the shaft 39, Fig. 11.

At each rotation of the shaft 39 the lug 128 strikes the end of a lever 129 pivoted at 129¹ and having its opposite end forked at 129² to embrace the lever 29. The rocking motion of the lever 129 raises the lever 29 against the spring 30 to cause it to be again latched by the swinging latch 28, the lever 25 having in the meantime been moved out of the notch 23 by the rotation of the ratchet wheel 19, effecting the separation of the clutch members 31 and 33 until such time as the rotation of the ratchet wheel 19, Fig. 14, has brought the notch 23 of the flange 24 in position to be engaged by the lever 25, thereby allowing the spring 26 to swing the latch 28 and release the clutch lever 29, when the tension of the spring 30 will again bring the clutch members 31 and 33 into engagement, and the banding mechanism resume its cycle of operations.

I claim,

1. In a machine of the kind specified, a receptacle for assembled units, and means for feeding units into said receptacle comprising a chute for guiding the units, means for moving each unit along said chute into a position to fall by gravity into said receptacle, and means for imparting a blow to the rear edge of each unit to move said unit from the chute into said receptacle.

2. In a machine of the kind specified, a receptacle for the assembled units, means for feeding the units into said receptacle, means for moving the receptacle with its assembled units into a position removed from said feeding mechanism, a fixed stop against which the assembled units are moved in the last named position of said receptacle, said stop being arranged to compress the assembled units as they are brought against it, and means for withdrawing said stop after said units have been secured together in their compressed condition.

3. In a machine of the kind described, a receptacle for supporting the assembled units on their lower edges with their upper edges exposed, a reciprocating plunger, a pair of parallel plates supported on said plunger above the assembled units, with the lower edges of said plates divergent, means for interposing a band between said plates and the upper edges of the assembled units, and means for depressing said plates to fold the interposed band over the upper edges of the assembled units.

4. In a machine of the kind described, a receptacle for the assembled units, with their upper edges exposed, a pair of parallel plates held above the assembled units, having their lower edges divergent, said plates being spaced apart a distance equal to the desired thickness of the assembled units.

5. In a machine of the kind described, a banding mechanism comprising means for holding the object to be banded in a stationary position, a pair of reciprocating parallel plates having divergent edges adapted to slide over the object to be banded, said plates being spaced apart a distance less than the thickness of the object to which they are to be applied, whereby the latter is compressed.

6. In a machine of the class described, means for holding the object to be banded, a reciprocating plunger, a pair of parallel plates adjustably held by said plunger and having their free edges divergent, and means for actuating said plunger to slide said plates over the object to be banded.

7. In a machine of the kind described, a banding mechanism, comprising means for supporting the object to be banded in a fixed position, means for extending a band transversely across the upper edge of said object, means for folding said band across the upper edge of the object and upon the two adjacent sides, means for folding the band across the lower edge of the object, and a pair of guide plates for preventing the accidental lateral displacement of the band.

8. In a machine of the kind described, a magazine for the bands, a picker to which adhesive material has been applied, a slide carrying said picker, a guide for said slide, pivoted at one end to the framework, means for reciprocating said slide along said guide and over the object to be banded, and means for imparting a rising and falling movement to the free end of said guide.

9. In a machine of the kind specified, a magazine for the bands, a picker to which adhesive material has been applied, a slide carrying said picker, a guide for said slide extending over the edge of said magazine and over the object to be banded, means for imparting a reciprocating movement to said slide along said guide, and means for imparting an up and down movement to said guide.

10. In a machine of the kind specified, a guide bar extending transversely across the object to be banded, a slide movable along said guide, means for imparting a reciprocating movement to said slide, a rocking shaft carried by said slide, a picker carried by said shaft, and means for imparting a rocking motion to said shaft at one end of the reciprocating movement of said slide.

11. In a machine of the kind described, a receptacle for the object to be banded, comprising one fixed side and one movable side spaced apart a distance less than the normal thickness of the object to be banded, means for moving said movable side to effect the initial compression of the object, means for extending a band transversely across the object, and means for simultaneously compressing the object and folding the band over one side and upon the two adjacent sides of the object.

Dated this fifteenth day of January 1913.

RUSSELL W. LEWIS.

Witnesses:
D. E. TRAVIS,
W. E. STEELE.